[19] United States Patent
Paulson

[11] Patent Number: 6,082,193
[45] Date of Patent: Jul. 4, 2000

[54] PIPELINE MONITORING ARRAY

[75] Inventor: Peter O. Paulson, Calgary, Canada

[73] Assignee: Pure Technologies Ltd., Alberta, Canada

[21] Appl. No.: 08/838,849

[22] Filed: Apr. 11, 1997

[51] Int. Cl.[7] .................................................. E21B 45/00
[52] U.S. Cl. ......................................................... 73/152.58
[58] Field of Search ........................... 73/152.47, 152.58, 73/40.5 A, 579, 866.5, 592

[56] References Cited

U.S. PATENT DOCUMENTS

| | | | |
|---|---|---|---|
| 3,575,040 | 4/1971 | Bosselaar et al. ....................... 73/40.5 |
| 4,033,179 | 7/1977 | Romrell . | |
| 4,609,994 | 9/1986 | Bassim et al. . | |
| 4,640,121 | 2/1987 | Leuker et al. . | |
| 4,715,019 | 12/1987 | Medlin et al. ............................ 367/28 |
| 4,907,204 | 3/1990 | Medlin ..................................... 367/35 |
| 4,962,489 | 10/1990 | Medlin et al. ............................ 367/32 |
| 5,333,501 | 8/1994 | Okada et al. . | |
| 5,433,104 | 7/1995 | Kunze et al. . | |
| 5,602,327 | 2/1997 | Torizuka et al. ......................... 73/592 |

FOREIGN PATENT DOCUMENTS

| | | |
|---|---|---|
| 1153 100 | 8/1983 | Canada . |
| 42 07 067A | 9/1993 | Germany . |
| 61-017929 | 1/1986 | Japan . |

OTHER PUBLICATIONS

Travers F., "Acoustic Monitoring of Prestressed Concrete Pipe at the Aqua Fria River Siphon", US. Dept. of the Interior, R–94–17, Dec. 1994.

*Primary Examiner*—Benjamin R. Fuller
*Assistant Examiner*—Jewel V. Thompson
*Attorney, Agent, or Firm*—Blake, Cassels & Graydon LLP; George E. Fisk

[57] ABSTRACT

An array of acoustic sensors spaced along a cable is deployed in a fluid filled concrete pipeline and the sensors are monitored to find acoustic anomalies, particularly anomalies resulting from breakage of a reinforcing wire for the concrete. The location of wire breaks is found from the data collected.

33 Claims, 11 Drawing Sheets

PIPELINE MONITORING ARRAY

FIELD OF THE INVENTION

The invention relates to the monitoring of reinforcement cable breakage in concrete pipelines.

BACKGROUND OF THE INVENTION

Many large pipelines are made of reinforced concrete. Such pipelines are used, for example, to move fluids such as potable water or sewage, or to take fluids across some obstacle, such as a river or embankment, by means of an inverted syphon.

In many cases, the concrete pipes used to make the pipelines are prestressed by wrapping tensioned wire around the pipe. Usually this is done by wrapping a single long wire repeatedly around the pipe, often to several thicknesses, and covering it with a grout or concrete layer. Other arrangements such as multiple wires embedded in the concrete are also known. The inclusion of such tensioned wire in the concrete is particularly important to prevent pipeline rupture when the fluid which passes through the pipeline is under pressure.

As pipes age, the wires often break. It has been known that the breakage of tensioning cables or wires in concrete structures causes a noise. Thus, acoustic monitoring of structures can indicate that a tensioning cable or wire has snapped. The breaking of a wire will hereinafter be called "wire breakage".

Attempts have been made to monitor pipelines for an acoustic signal generated by wire breakage by drilling holes through the outer surface of the pipeline wall and mounting hydrophones through the holes. Also, it has been tried to mount a hydrophone on an apparatus suspended in the fluid of the pipeline to listen for such acoustic signal generated by wire breakage. It has also been tried to use an instrumented pig to search for acoustic anomalies. However, these methods are very expensive to implement, and the pig method is not suitable for long term monitoring, as it occludes fluid flow.

Other occurrences of interest in a pipeline can also have acoustic effects. For example, a leak can create acoustic signals. It would be useful to collect the signals from such effects.

SUMMARY OF THE INVENTION

A method and apparatus has been invented for monitoring pipelines for acoustic events. Acoustic events can be indicative of wire breakage or other events, such as the development of a leak. Thus, in accordance with a broad aspect of the present invention, there is provided a method of acquiring acoustic data in a pipeline which comprises: deploying a cable within the pipeline having a plurality of acoustic sensors thereon; and monitoring said sensors for detected acoustic signals.

In accordance with another broad aspect of the present invention, there is provided a sensor array for use in a pipeline comprising a cable, a plurality of sensors spaced along the cable, at least one means for generating an acoustic signal located on said cable, and means for acquiring discrete acoustic information from each of said sensors.

In accordance with another broad aspect of the present invention, there is provided a sensor device for use in a pipeline, the sensor device comprising a plurality of acoustic sensors fixed together in relative position to one another and means for determining the orientation of at least one of the said plurality of sensors relative to a known direction.

In accordance with another broad aspect of the present invention, there is provided a pipeline system having access points at known locations, comprising: at least one acoustic sensor disposed at each of a plurality of the access points and a data collection device for each acoustic sensor.

In accordance with another broad aspect of the present invention, there is provided a method of acquiring acoustic data in a pipeline having access points at known locations, the method comprising deploying an acoustic sensor at each of a plurality of access points, each of the acoustic sensors having its own data collection device, monitoring said sensors for detected acoustic signals and recording data relating to the acoustic emissions detected by the acoustic sensor at each access point to its own data collection device.

DESCRIPTION OF THE INVENTION

According to one aspect of the invention, a cable is deployed in the pipeline, with at least one acoustic sensor attached. The acoustic sensor is selected to detect acoustic emissions in the fluid in which it is put. The acoustic emissions are those generated by an acoustic event in a pipeline such as emissions produced by a wire break or a high pressure leak. In a preferred embodiment, the sensor is a hydrophone.

In one embodiment, there is a plurality of sensors, spaced from one another along the cable to form an array of sensors. As an example, piezoelectric hydrophone sensors can be placed at intervals of 150 meters along a cable 8000 meters long in a concrete sewer pipeline.

It is preferred to have the array of sensors lying along the bottom portion of the pipe. If the turbulence of the moving fluid being transported within the pipe causes appreciable motion of the sensors, then the sensors can be provided with stabilizers. The stabilizers can be designed to use any or all of gravity, fluid flow and tension within the cable to stabilize the array by preventing or reducing the sensor movement. Preferably, hydrophones or other sensors for use in the invention can be shaped so that they will be pushed against the wall and retained against the wall by the fluid flow.

The sensors are preferably streamlined to minimize the noise produced by turbulent flow past the sensor. Also, because a hydrophone can detect an acoustic signal because of its own physical acceleration, hydrophones which are resistant to noise produced by their own acceleration are preferred. As an example, a particularly preferred form of sensor is a hydrophone having a sensor formed as a piezoelectric film wrapped around a grooved mandrel. In this hydrophone, sensing takes place in the groove.

It is recognized that the sensors, particularly if they rest upon the bottom of a pipeline, might accumulate sediment about them. However, this is not a disadvantage, as it reduces extraneous noise from turbulent flow about the sensor. Indeed, the sensors can, if desired, be designed deliberately to accumulate sediment around them when in position on the floor of the pipe.

The array provides unique, discrete information from each sensor location. This can be done, for example, by providing different channels or conductors from each sensor to a data collection point or by providing a series of channels such that each sensor records on a unique combination of shared channels. Each sensor senses the acoustic conditions surrounding it, and the resulting data are conveyed along the cable to a data collection point preferably outside the pipeline. The cable is selected to provide for the transmission of data from the sensors to the data collection point. For example, the cable can include electrical or fibre optic conductors. The data arriving at the data collection point can either be processed there or stored and relayed elsewhere, by any means, for processing. The locations of the sensors along the cable are known and preferably, the data collection point has means for recording the time of arrival of each signal at each sensor. Therefore, the time of arrival of each event-generated signal at one or more sensors on each side of the event permits estimation of the location of the event knowing the rate of acoustic signal propagation through the fluid of the conduit (i.e. generally 1,500 m/sec.).

It is preferred that each sensor array be designed so that there is at least one sensor at each point in the pipeline where the direction of the pipeline changes. This improves the accuracy of location calculations for acoustic events, as otherwise it is difficult to obtain a precise location of an event occurring near the change in direction of the pipeline.

In order to reduce cost and wiring complexity, the sensors in an array can be spatially multiplexed in any suitable way. In one embodiment, the sensors along an array are spatially multiplexed so that each sensor is given a unique connection to two channels. Thus, whenever an event is sensed at a sensor, a signal is generated on each of the two channels to which the sensor is connected. Because only one sensor records on these two channels, the sensor which detected the event is then known. If we call the time at which the first sensor records the event time 0, the event will then be detected at other sensors which are further away from where the event happened at time 0 plus an additional time T1, T2, T3 . . . etc depending on the location of the sensor relative to the first sensor. There may be some ambiguity as to some of these signals because they are recorded by a sensor connected to the same channel as a sensor detecting earlier recorded events. However, because each sensor has a unique two-channel connection, it is possible to cancel out the ambiguities through data manipulation and thereby permit data collection with fewer channels. As an example, in an array having ten sensors S1, S2, . . . S10, a data collection system without spatial multiplexing would require ten channels for signal identification and event location. However, a similar array with ten sensors having spatial multiplexing as described above requires wire connections from the sensors to only five channels.

In situations where the velocity of the fluid in the pipeline is low, relative to the distance between sensors, the effect of the fluid velocity does not appreciably affect the calculation of the location of acoustic events. However, where the velocity is appreciable, or where more precision as to event location is required, it is desirable to measure the velocity of the fluid and remove its effect from the calculation.

A convenient method according to the invention of removing the effect of fluid velocity from the calculation is to place a means for generating acoustic signals, such as an impactor (i.e. an electric solenoid or a pneumatic cylinder) or a transponder, at a known position in the pipeline relative to two of the sensors. The means for generating signals can be mounted on the interior surface of the pipeline, on the cable or on a sensor. In one embodiment, the means for generating acoustic signals is a piezoelectric transponder. The transponder can be stimulated from a remote location to generate an acoustic pulse. In a situation of no fluid flow, the relative times of arrival of a pulse from the transponder at the two sensors will have the same ratio as the relative distances from the transponder. Therefore, measurement of the actual differences of the time of arrival of a pulse at the two sensors, and a comparison with the result which would occur in a no fluid flow situation, provides the measure of correction which needs to be given to correct for fluid flow in the pipeline. This does not require any calculation of the velocity of sound in the fluid medium: all that is necessary is to compare times of actual arrival of the generated pulse to those which would occur in a no flow condition to get a correction factor.

The velocity of sound in a medium may change as conditions in the pipeline change. Therefore, according to the invention, a calibration can be made by stimulating a transponder to emit a calibrating signal shortly after an acoustic signal of possible interest has been recorded at a sensor on the array. This permits a distance measure correction calculation, as described above, to be made for the conduit at that time.

As an example, a wire break in a tensioned cable surrounding a concrete conduit emits a characteristic sound. A sensor array deployed to monitor the acoustic condition of the conduit can be selected such that when a signal is processed by the data collection device of the array which has characteristics resembling those of the sound of a break, the device sends a signal to the transponder which causes it to produce an acoustic pulse. The appropriate characteristics, for example the duration and frequency distribution of the sound which is made by a wire break, can be determined by inducing test wire breaks in the reinforcing cables of the pipeline and examining the emitted signals as received by a sensor.

The use of the invention requires only access to the pipe at widely spaced intervals. Holes do not have to be drilled into the pipe, as existing inspection ports and/or the ends of the pipeline can be used.

The sensors can be tested periodically by various means to confirm proper operation such as by operating the transponder, causing impact against the conduit, and/or by using a moving acoustic source conveyed through the pipeline.

The array of sensors spaced longitudinally along the conduit is useful for determining the longitudinal location of an acoustic event along the conduit. It is also useful to determine the circumferential location of the event in the conduit. To make such a determination, a cluster of sensors can be used. Any event signal will arrive at the sensors of the cluster at different times depending on their relative positioning and hence their relative distance from the location of the event. To be useful, the sensors of the cluster must be secured together in a known arrangement. In addition, the cluster must be in a known orientation in the conduit. Thus, the cluster of sensors includes an orientation indicator which indicates the positioning of at least one sensor relative to a known direction and/or to a known point on the cross section of the conduit wall, for example, the bottom or the top of the conduit according to gravity. A useful orientation indicator is a mounting means, such as a bracket, which is used to mount the cluster in a fixed position within the conduit. As an example, a mounting means can be used with a two-sensor cluster to mount the cluster with the two sensors in a horizontal plane and with the first sensor closer to the right hand side of the conduit. Another useful orientation indicator is an accelerometer, for example those known as Q-flex-type or dynamic-type accelerometers. Accelerometers can be used, when positioned in a known way within the cluster, for determining the orientation of the accelerometer, and with it the cluster, relative to the bottom of the conduit as determined by gravity.

The cluster of sensors can be used and deployed on its own. Alternately, the cluster can be mounted in association with other sensors or sensor clusters, for example by spacing clusters along a cable.

The deployment of the array can be assisted by the flowing fluid. The hydrophone array can be inserted into the pipeline at any convenient point (as an end of the pipeline or an inspection port), and the sensors (preferably hydrophones) can be allowed to drift downstream until the cable is stretched. Alternately, the array can be designed so that the fluid flow causes the hydrophones to slide along the bottom of the pipeline until the cable is stretched. If it is desired to have positive placement of the hydrophones, a line can first be stretched between two access points and the line can be used to draw the array into the pipe.

Insertion of the hydrophone array into a pressurized pipeline can be carried out by the use of technology already known for the insertion of objects into pressurized pipelines. One such device is known as a lubricator, and is well known in oil field technology.

It is particularly advantageous that the array can be withdrawn from the pipe merely by pulling on the cable, without the necessity of opening up the pipe at the location of each of the sensors. The pipe itself offers protection for the array and for the cable, so they are not subject to breakage from external movements within the ground.

During deployment or withdrawal of an array, it is an aspect of one embodiment of the invention to have at least one sensor acquire data. Thus, as the sensor drifts down the pipe to its eventual permanent position, or is pulled down the pipe by a line, or is pulled back to its entry point for removal, the sensor continues to acquire data. This data shows anomalies where there is turbulent activity in the pipeline. Such turbulent activity could indicate a leak or an obstruction, which can be further examined. The position of the sensor at the time of acquisition of the data can be measured or calculated from the length of cable deployed.

The sensors can be used in association with other pipeline monitoring means such as video cameras.

Some fluid pipeline systems, for example, systems for bringing drinking water from remote locations, have many miles of pipelines which require surveillance. Installation of long multiple sensor arrays throughout the entirety of such areas is very costly and can sometimes be impossible or hazardous because of inconveniently located access points such as access points in the roadbed of a highway.

To overcome such problems, at least one sensor can be installed at each of a plurality of access points such as, for example, at the access valves located under the manholes, in the pipeline system to be monitored. The sensors can be as disclosed previously and can be installed at the access points by any suitable means such as, for example, by attachment to a cable anchored at the access point, attachment to an exposed portion of the pipe at the access point (i.e. the internal wall) or attachment directly to the valve at the access point. The sensors disposed in the system are then monitored for recorded acoustic signals. The acoustic signals detected by the sensors are recorded to separate data collection devices which are arranged to collect the data from the sensors at, preferably, only one access point. This thereby avoids the requirement of having physical connections, for example wires, extending long distances and between access points. Preferably, there are only one or two sensors disposed at any one access point in a convenient way such as by mounting to the valve or extending from a short cable. This reduces the amount of time required to deploy the sensors when compared to deploying an array, for example, which is many hundreds of feet long.

Recorded information relating to detected acoustic signals can be analyzed, either immediately or at a later time, to determine significant signals, for example, those relating to wire breakage. Wire break frequency, and wire break locations can be determined by studying the recorded signals. Where a significant frequency or number of acoustic events have been detected in a pipeline section, an array such as that described previously having a plurality of sensors disposed over a long length of cable can be deployed in the pipeline to more precisely determine the location of any acoustic events along the pipeline section. Alternately, or in addition, where a pipeline section has been identified as having significant amounts of acoustic activity, a cluster of sensors can be deployed within the pipeline section to identify the location on the circumference of the pipeline in which the break occured.

Where single sensors are disposed at selected access points in a pipeline system, various methods can be used to identify the location of breakage events. In one embodiment, signal distortion characteristics are used. As the signal from any event is propagated through the pipeline, factors such as multipath reflection and dispersion tend to attenuate the signal in proportion to the conditions in the pipeline and, additionally, in proportion to the distance the signal has traveled. For a given pipeline, the characteristic signal attenuation can be determined, for example, by generating a signal at a known location, logging the resulting signal at other known points in the pipeline and observing the attenuation characteristics. From this observation, an algorithm can be obtained which gives the rate at which signal attenuation occurs. Signals recorded at a sensor can be analysed using the algorithm to provide a general measure of the distance between the sensor recording the signal and the source of the signal.

To determine the location of an acoustic event of interest using calculations which compare the arrival times of the event-generated signal at the various sensors, it is necessary to record with accuracy when signals arrive at each of the sensors. One method for recording the arrival times accurately requires connecting the sensors, by physical wires, wireless radio links, or optical links, to a single data collection device having a timer for determining the signal arrival time at each sensor. However, such connections are difficult or impossible to install in the field. Where each sensor has its own data collection unit and timer, time synchronization must be achieved between the sensors. Such synchronization can be accomplished by means of a synchronizing pulse transmitted simultaneously at regular intervals to sensors in the area. Such a pulse can be generated using electro-magnetic waves, such as radio waves or global positioning systems. Under water modems can also be used to synchronize between sensors.

A synchronization pulse can alternately be generated by a transponder or impactor located within the pipeline. In one such embodiment, the pulse is generated following the detection of an acoustic signal of interest by a selected sensor. Preferably, the generated signal is chosen to be easily discernible from breakage events or normal environmental acoustic events. The timer on each sensor in the area records the arrival times of the event of interest and the generated synchronization pulse. The arrival times of the synchronization pulse is used to correct the arrival times for the event of interest. The arrival times for the event of interest at the different sensors are then compared and conventional location calculations are used to determine the source location of the event of interest.

Where it is only desired to determine from which location an acoustic signal is arriving at an access point, such indication can be obtained by positioning a second sensor at selected access point close to the first sensor disposed there. The second sensor is spaced a selected distance from the first sensor along the longitudinal axis of the pipeline and synchronized or connected in a suitable way to detect a difference in signal arrival times between the two sensors. This will permit a determination of the direction of an event relative to the location of the sensors, as it can be determined which sensor detects the acoustic event first.

BRIEF DESCRIPTION OF THE DRAWINGS

The preferred embodiments of the invention will now be described in detail with reference to the following drawings, in which.

DETAILED DESCRIPTION OF THE PREFERRED EMBODIMENT

Figure 1:
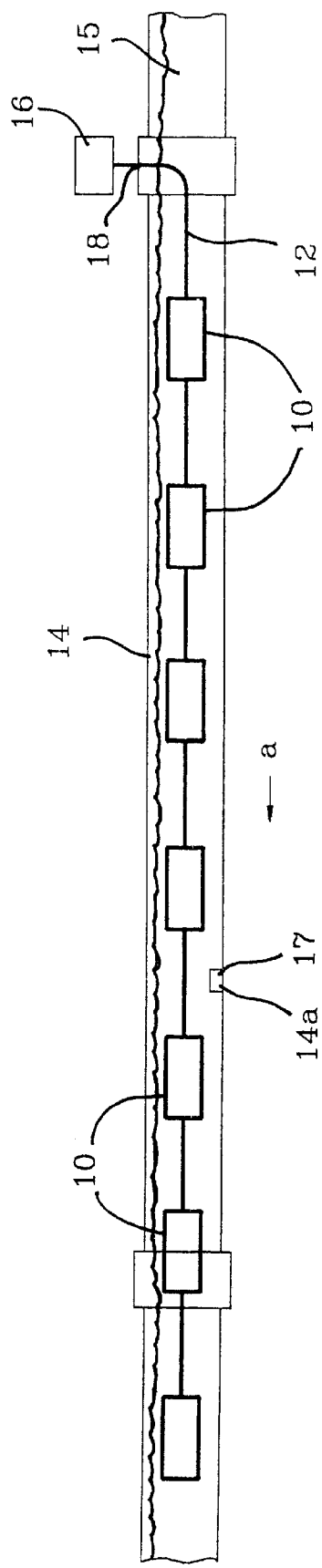
FIG. 1 is an elevation view of a hydrophone array deployed within a pipeline according to the present invention.

Referring to FIG. 1, an array including a plurality of hydrophones 10 connected together by an electrical cable 12 is deployed within a concrete conduit 14 having reinforcing tensioned wires (not shown). The conduit contains a fluid 15. The cable exits from the conduit at a suitable location 18 which can be, for example, an inspection port or a valve and is connected outside the conduit to data collection device 16. A transponder 17 for emitting acoustic pulses is mounted on the interior wall 14a of the conduit. The transponder can be located at any location on the inside of the conduit wall or on an access valve or on a sensor or on the cable. The cable extends from access port 18 in the conduit such that the hydrophones 10 are positioned in the conduit and are towed in the direction of fluid flow, as indicated by arrow a. The hydrophones are spaced along the array at known distances. In a useful and cost effective array, the hydrophones are preferably spaced at 200' intervals. Device 16 is positioned outside of the conduit to be easily accessible. Hydrophones 10 can be, for example, those known as AQ-503 available from Benthos Corporation (North Falmouth, Md.) or those known as ST-5 available from Innovative Transducers (Fort Worth, Tex.). The hydrophones sense acoustic signals within the conduit and transmit electrical impulses proportional to the acoustic signals received through cable 12 to device 16. Preferably, the cable and hydrophones are coated with a dielectric such as, for example, urethane to reduce noise in the signal from the hydrophones. The dielectric is, preferably, suitable for use in potable water so that the array can be introduced to drinking water distribution pipelines. Each hydrophone communicates independently with the device so that data for each sensor is compiled separately. Device 16 can be any suitable means for recording or recording and processing electrical signals from sensors such as hydrophones. The device preferably includes an interface to which the hydrophones are coupled and which associates signals detected at each of the hydrophones with a time of arrival by means of an accurate timer. The interface passes the signals to a processing unit which filters the data and identifies events of interest on the basis of the signal characteristics.

Figure 2:
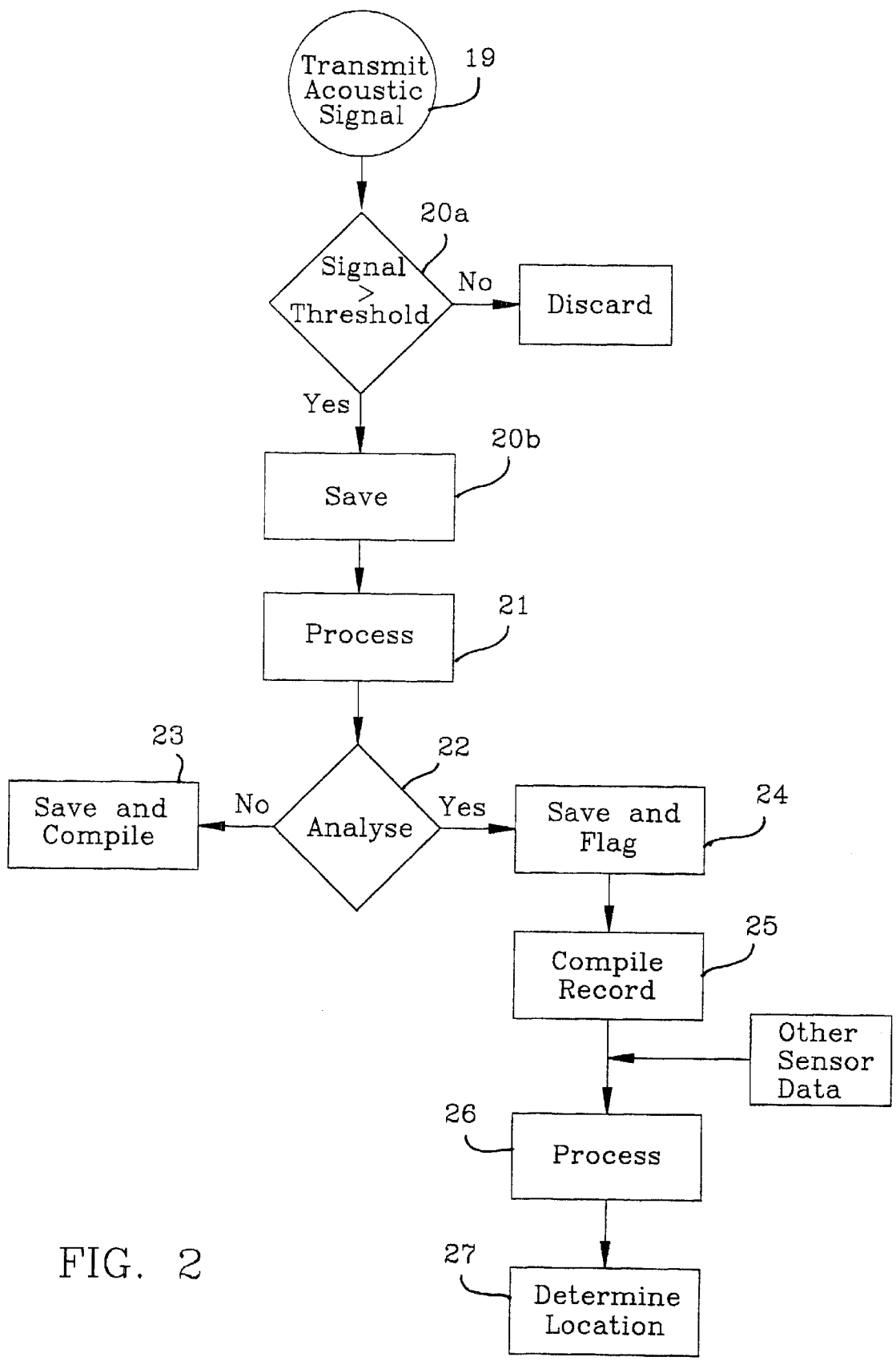
FIG. 2 is a flow chart of one embodiment of a method according to the present invention.

Referring to FIG. 2, one method of operation of the monitoring array shown in FIG. 1 is described. Signals sensed at the hydrophones 10 are continuously transmitted (19) to the data collection device 16. Any signal which exceeds a background noise threshold (20a), is saved (20b) by device 16. Either immediately or at a later date, the signal information is processed (21) to determine its signal characteristics. Processing can be done by device 16 or the signal information can be downloaded to another device for processing. The data acquired in step 21 is then analysed (22), for example, to determine if it resembles the known signal characteristics of an event of interest such as a wire break or the signal generated by a transponder 17. If it does not match, then the event data is saved and a record is compiled (23) so that it can be examined further, if and when necessary. If it does resemble an event of interest, then the data is saved and flagged (24) and, of course, a record is also compiled (25). This method is used for signals detected by all of the hydrophones in the array. All of the event data from other hydrophones which appears to correspond to the same event of interest is compiled and processed (26) by comparing arrival is times of the signal at each of the hydrophones to determine the location of the event (27).

Using an array with two hydrophones (H1 and H2) located a known distance apart, for example the first and last hydrophones along the array shown in FIG. 1, the location of a wire break can be determined by comparing the arrival times of a signal at the two hydrophones. An example calculation is as follows:

| | |
|---|---|
| distance between H1 and H2: | 1,500 m |
| arrival time at H1: | 10:00:00.000 |
| arrival time at H2: | 10:00:00.333 |
| difference in arrival times ($\Delta t$): | .333 sec |
| rate of signal propagation through water (v): | 1,500 m/sec |
| ∴ the origin of the event is | |
| $\Delta t \cdot v$ | = 0.333 sec · 1500 m/sec |
| | = 500 m closer to $H_1$ than $H_2$ |
| Letting | $DH_1$ = the distance from the event to $H_1$ and |
| | $DH_2$ = the distance from the event to $H_2$ |
| i | $DH_2 = DH_1 + 500$ |
| ii | $DH_1 + DH_2 = 1500$ m |
| iii | $DH_2 = 1500$ m $- DH_1$ |
| | Substituting equation i into iii |

Figure 3:
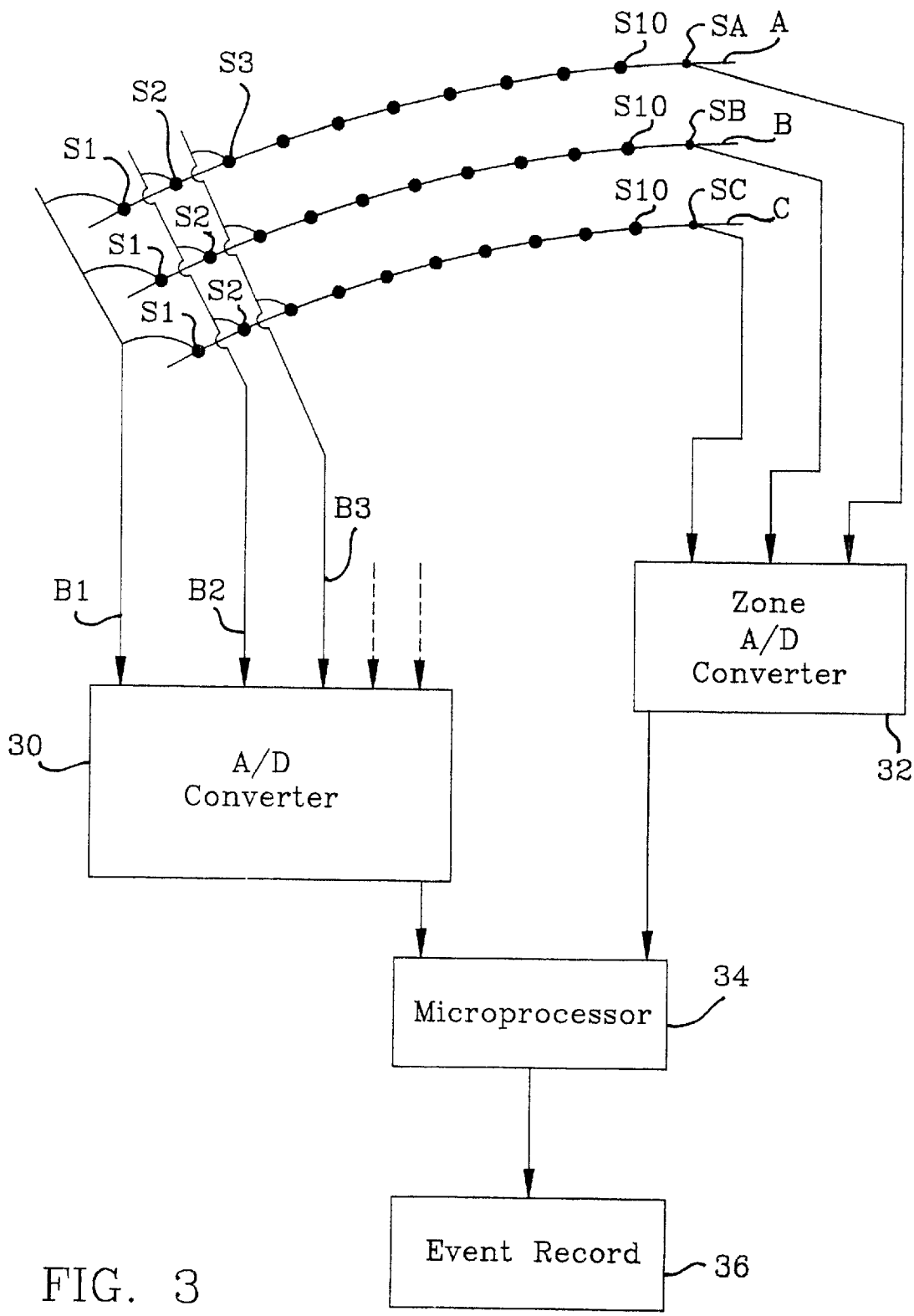
FIG. 3 is a schematic diagram of an embodiment having an array employing spatial multiplexing.

-continued (DH$_1$ + 500 m) = 1500 m − DH$_1$
2 DH$_1$ = 1000 m
DH$_1$ = 500 m
and using equation ii, DH$_2$ = (1500 m − 500 m)
DH$_2$ = 1000 m To reduce wiring complexity, spatial multiplexing can be used. This can be done for arrays deployed in different zones of a pipeline or for hydrophones on one array. Referring to FIG. 3, in one embodiment there are three arrays A, B, C each having ten sensors. Each sensor along each array is identified, for example, as S1, S2 . . . S10 and is at a known location on its cable. All sensors S1 (one on each array) are connected in parallel to a first bus B1, all sensors S2 are connected in parallel to a second bus B2, all sensors S3 are connected to a third bus B3 and so forth. The sensors' outputs are isolated in any suitable way so that the output of any one sensor does not affect the output of the others, for example, each sensor's output can be fed through its own preamplifier. Each array also has a sensor SA, SB or SC, respectively, which serves to identify the array. The outputs of the sensors S1 to S10 are applied via their respective buses to an A/D converter 30, while the outputs of the zone array sensors SA, SB, SC are applied to an array A/D converter 32. The function of zone array sensors SA, SB, SC is simply to identify the array on which a failure event is first detected. The location of the wire break along the zone in which the array is identified by comparing the time of arrival of the signal of interest at each of the sensors S1 to S10. The multiplexed output signals from A/D converters 30, 32 are applied to a processor (34), which keeps track of events and their time of arrival and outputs the event record (35).

Figure 4:
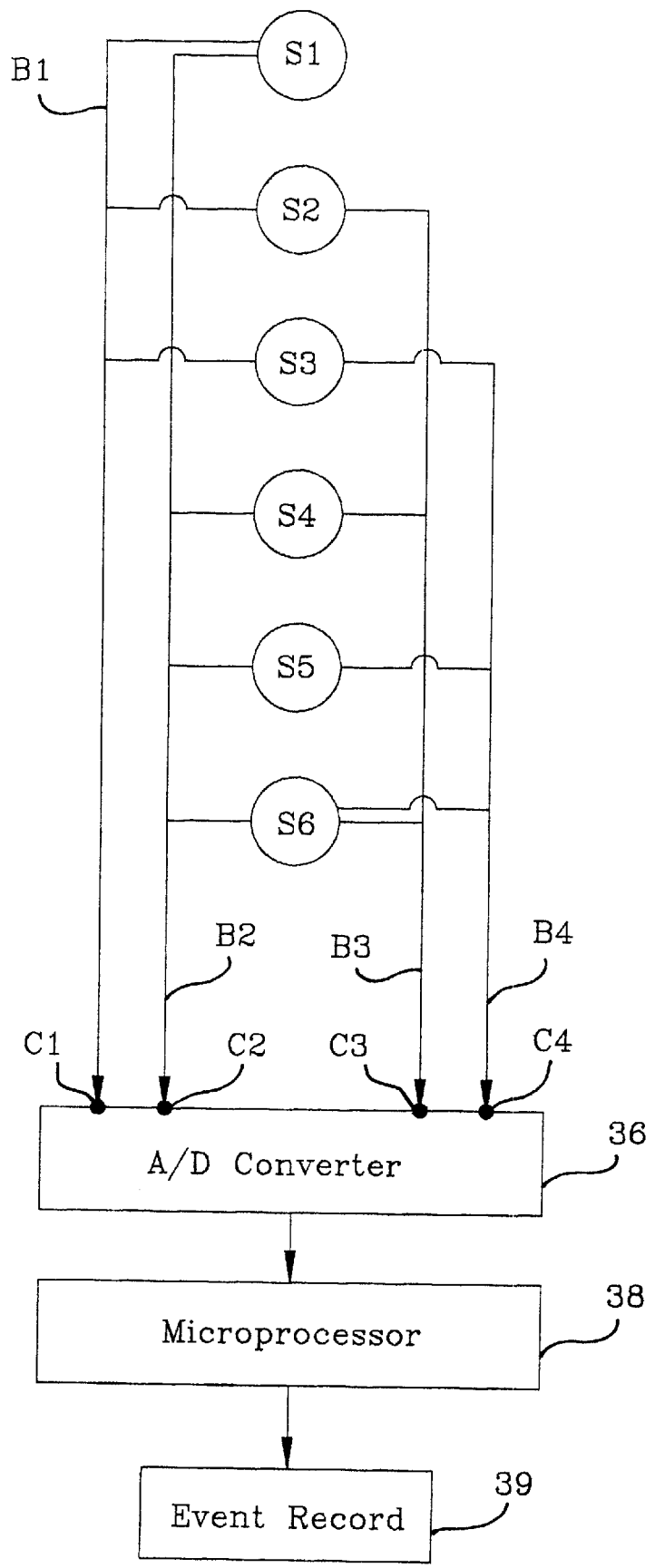
FIG. 4 is a schematic diagram of another embodiment having another type of array employing spatial multiplexing.

In another embodiment utilizing spatial multiplexing as shown in FIG. 4, the sensors along an array are spatially multiplexed. An array has six sensors S1, S2, . . . S6. Sensors S1, S2 and S3 are connected in parallel to a bus B1, sensors S1, S4 and S5 are connected in parallel to a bus B2, sensors S2, S4 and S6 are connected in parallel to a bus B3 and sensors S3, S5 and S6 are connected in parallel to a bus B4. Each bus B1–B4 is connected to its own channel so that there are channels C1–C4, respectively, to input to an A/D converter 36. The multiplexed output signals from A/D converter 36 are applied to a processor (38), which keeps track of events and their time of arrival and outputs the event record (35). This arrangement provides that each sensor has its own unique set of connections to two channels, with no other sensor being connected to the same two channels. When a signal is detected at sensor S1, for example, this information will be transmitted on buses B1 and B2 to channels C1 and C2. This will identify that sensor S1 detected a signal, as no other sensor transmits on those two channels. Other sensors will transmit on their own allocated two channels and, thus, it will be identified by the processor which other sensors detected the acoustic signal. There may be some ambiguity as to some of these signals because the sensor detecting them is connected to the same channel as sensors detecting earlier recorded events. However, because each sensor has a unique two-channel connection, there will be other recorded events which will allow identification of the location of the acoustic event along the array. The processor keeps track of the arrival times of signals at each sensor and outputs the event record (39).

Figure 5A:
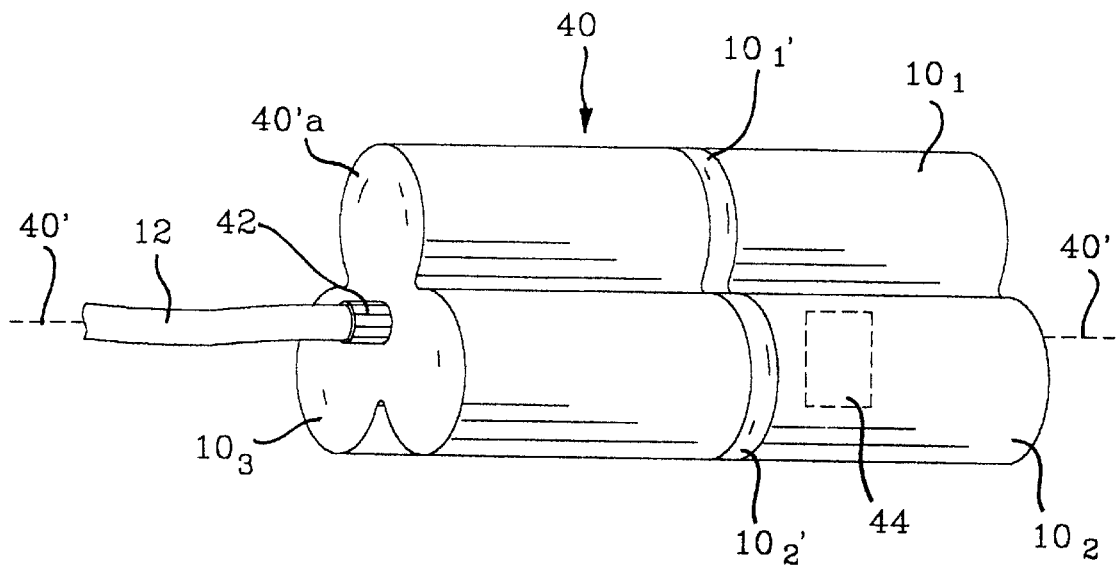
FIG. 5A is a perspective view of a hydrophone cluster useable with the present invention.
Figure 5B:
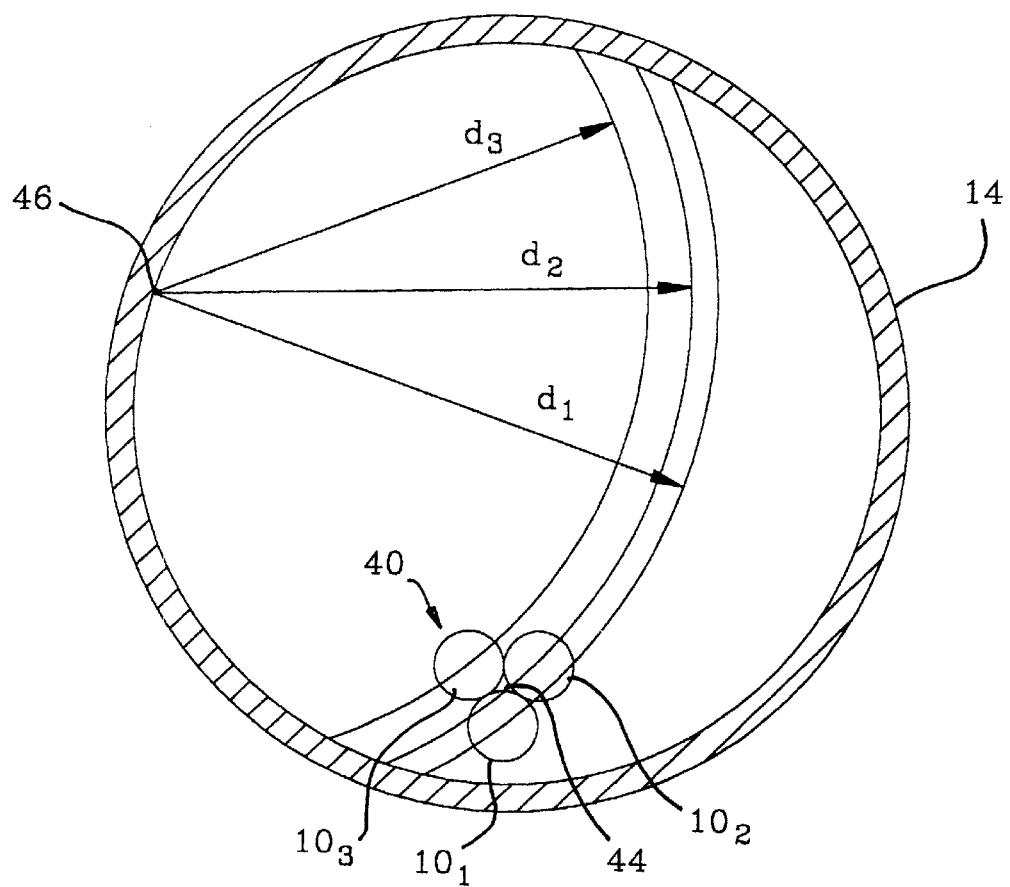
FIG. 5B is a schematic diagram of the hydrophone cluster of FIG. 5A within a conduit.

A sensor device for determining the circumferential position of an acoustic event within a conduit is shown in FIGS. 5A and 5B. The device 40 includes three hydrophones $10_1$, $10_2$, $10_3$ secured in a fixed position relative to each other, preferably with their sensing portions $10_1{}'$, $10_2{}'$, $10_3{}'$ ($10_3{}'$ is not visible in the Figure) aligned. A cable connection port 42 is provided at an end 40a of the cluster, preferably generally centrally between the hydrophones, for releasable connection of a cable 12. An accelerometer 44, shown in phantom, is positioned in the cluster between hydrophones $10_2$, $10_3$ to determine the positioning of hydrophone $10_1$ relative to the bottom of the conduit, as determined by gravity.

In use, device 40 is maintained in position in a conduit 14 by tension in cable 12 such that the long axis of the device, indicated by line 40', is parallel to the long axis of the conduit. This maintains sensing portions $10_1{}'$, $10_2{}'$, $10_3{}'$ substantially in a common plane substantially orthogonal to the long axis of the conduit. The hydrophones $10_1$, $10_2$, $10_3$ and accelerometer 44 each have independent connections to a data collection device (not shown) through cable 12 which records any sensed acoustic signals from the hydrophones. When an event of possible interest is recorded, the data collection device also records the orientation of hydrophone $10_1$ relative to the bottom of the conduit, by recording the accelerometer reading.

When a wire break, as indicated at 46, occurs an acoustic signal will emanate from the location of the break. Such signal will arrive at, and be sensed by hydrophones $10_1$, $10_2$ and $10_3$ at three different times as determined by their distances from the break location. Arrows $d_1$, $d_2$, $d_3$ show the wave fronts from the breakage which first reach each of the three sensors. Using the time of arrival information and hydrophone orientation information, the location of the break on the circumference of the conduit can be determined. It is necessary to know the relative fixed position of the sensing portions of the hydrophones and the orientation of the device within the conduit in order determine the correct location of the break using the signal arrival times.

Figure 5C:
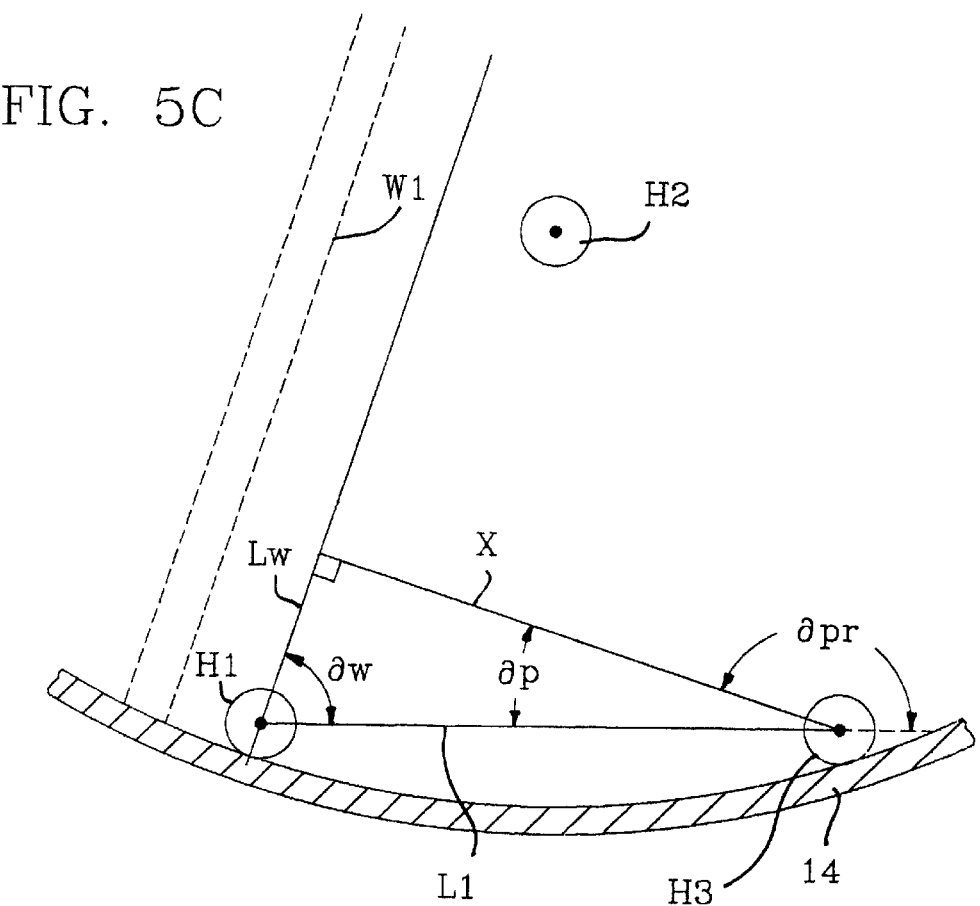
FIGS. 5C and 5D are schematic diagrams of a hydrophone cluster which illustrate one method for using the cluster to locate the source of an acoustic event.
Figure 5D:
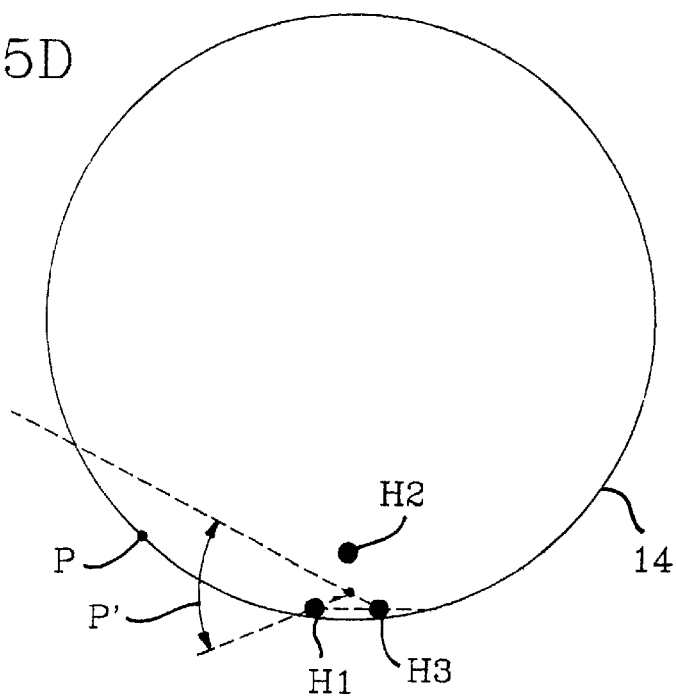

To illustrate the use of a hydrophone cluster to determine the general location of a break, the following example is provided with reference to FIGS. 5C and 5D. A hydrophone device having three hydrophones $H_1$, $H_2$ and $H_3$, as shown, is used. The three hydrophones are secured together to form the corners of an equilateral triangle with sides of length 2 cm. The device is positioned in a conduit 14 with the long axis of the device in alignment with the long axis of the conduit. The data from an accelerometer indicates that hydrophone $H_2$ is located furthest from the bottom of the conduit, according to gravity and hydrophones $H_1$ and $H_3$ are located below hydrophone $H_2$ and in a horizontal plane. An acoustic wave front is recorded at each hydrophone and the location on the cross section of the conduit of the break causing the acoustic wave front is determined, as follows:

Arrival times at $H_1$, $H_2$, $H_3$ for the arrangement above are
$H_1$=0.000000 sec
$H_2$=0.000010 sec
$H_3$=0.000013 sec
ΔT $H_1H_3$=0.000013 sec From the arrival times we can determine that the acoustic wave front $W_1$ emanates from a point P outside the device and that the wave front arrives at:
$H_2$ before $H_3$
$H_1$ before $H_2$ and
$H_1$ before $H_3$ The device is located in water and rate of acoustic signal propagation (v) in water is 1500 m/sec.

To determine location of the break which resulted in the acoustic wave front, a line $L_1$ is drawn joining $H_1$ and $H_3$.

When the wave front W1 reaches $H_1$, the front will make an angle $\partial w$ with line $L_1$ and using the wave front as a side of a triangle, a right angle triangle can be constructed having as its sides $L_1$, a line from $H_1$ parallel to the wave front ($L_w$) and a line drawn from $H_3$ which intersects $L_w$ at right angles (x). The right angle triangle defines angle $\partial w$ between sides $L_1$ and $L_w$ and angle $\partial p$ between sides $L_1$ and x.

With this amount of information, the sense and the direction of the source of the wave front can be determined by examining the arrival at $H_2$ relative to $H_3$ and $H_1$.

a) If $H_2$ arrives before $H_3$, the angle $\partial pr$ must be between the radial angles of 30° and 210°.
b) If $H_1$ arrives before $H_2$, the angle $\partial pr$ must be between the radial angles 150° and 330°.
c) If $H_1$ arrives before $H_3$, the angle $\partial pr$ must be between 90° and 270° radially.

To satisfy a+b+c, $\partial pr$ must be between 150° and 210° and the break which resulted in wave front W1 must be located in that segment of the conduit whcih is within these $\partial pr$ values relative to the position of the device within the conduit, as shown by P' in FIG. 5D.

To further resolve the location of the break, the following calculations can be made.

$$\text{Length of } L_1 = .020 \, m$$
$$\frac{x}{.020} = \text{Sin}\partial w$$
$$x = .020$$
$$\text{Sin}\partial w = .02 \text{Cos}\partial p$$

The average velocity of the wave front is v
the average time taken for the wave to move from where it intersects $H_1$ to where it intersects $H_3$ is $$\frac{x}{v} = \frac{.02\text{Cos}\partial p}{v}$$

Therefore, solving for Sin $\partial w$ $$\frac{.020\text{Cos}\partial p}{v} = \Delta T H_1 H_3$$

$$\text{Cos}\partial p = \frac{\Delta T H_1 H_3 \cdot v}{.020}$$

Therefore, when the difference in arrival times is known, and the wave front reaches $H_1$ before $H_3$, and $H_2$ before $H_3$, the source of the wave as measured from $H_3$ can be described as being along a line from $H_3$ at an angle $\partial p$ where:

$$\text{ArcCos}\partial p = \frac{\Delta T H_1 H_3 \cdot v}{.020}$$

and using the arrival times for the device of FIG. 5C:

$$\text{ArcCos}\partial p = \frac{.000013 \cdot 1500}{.020}$$

Therefore the break P which resulted in the acoustic wave can be located by extending line x from the location of hydrophone $H_3$ at an angle 5.5° relative to line L1 until it intersects the conduit.

Figure 6A:
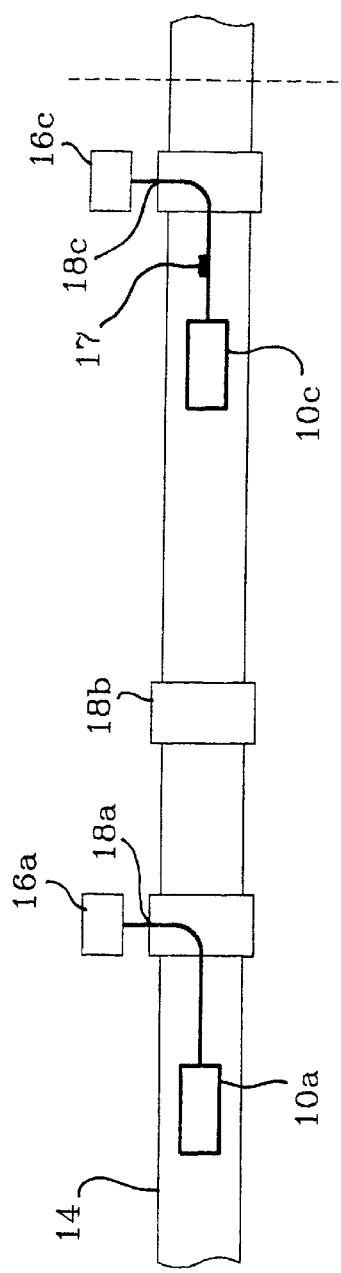
FIGS. 6A, 6B and 6C are schematic views of further embodiments of pipeline monitoring systems according to the present invention.

Another embodiment of a monitoring system for a pipeline is shown in FIG. 6A. A length of a typical water distribution pipeline 14 has a plurality of pre-existing access points 18a, 18b, 18c such as manhole access valves. A monitoring system according to the present invention includes hydrophones 10a and 10c mounted at selected access points 18a and 18c. Each hydrophone is connected to its own data collection device 16a and 16c. The data collection devices are physically separated and have no physical connections with each other. In a preferred embodiment, a transponder 17 is positioned in close proximity to hydrophone 10c. Preferably, each hydrophone is within listening distance of the other so that any acoustic signal generated in the system, for example, an acoustic pulse generated by the transponder, will be detected by both of the hydrophones.

Figure 6B:
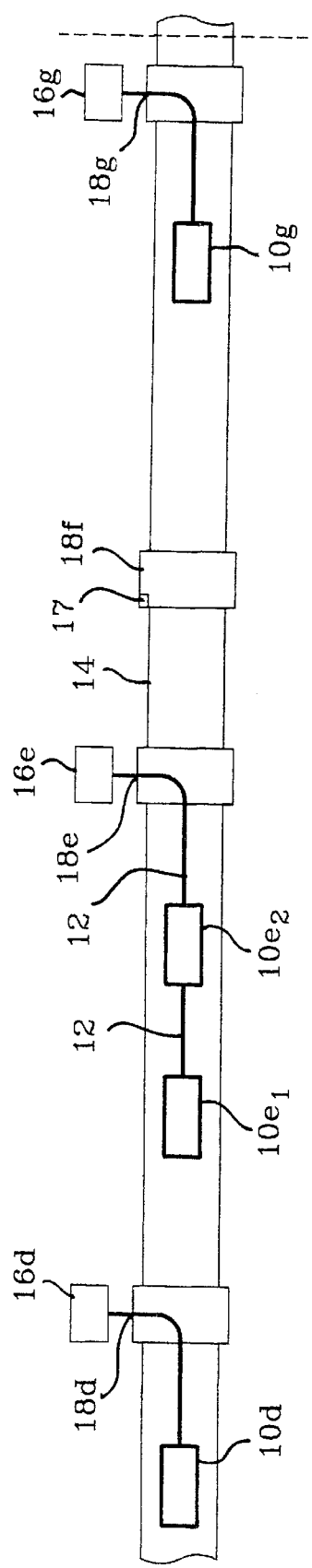

Another monitoring system for a pipeline is shown in FIG. 6B. A length of a typical water distribution pipeline 14 has a plurality of pre-existing access points 18d, 18e, 18f, 18g. Hydrophones 10d and 10g are mounted at selected access points 18d and 18g. Each hydrophone 10d, 10g is connected to its own data collection device 16d and 16g. At another selected access port 18e an array having two hydrophones $10e_1$, $10e_2$ is deployed. Hydrophones $10e_1$, $10e_2$ are spaced along the longitudinal axis of the conduit and are connected by cable 12 to a data collection device 16e which has a common timer but which compiles separately the data from the two hydrophones.

A transponder 17 is positioned at access point 18f. Preferably, each hydrophone is within listening distance of at least one other hydrophone.

Figure 6C:
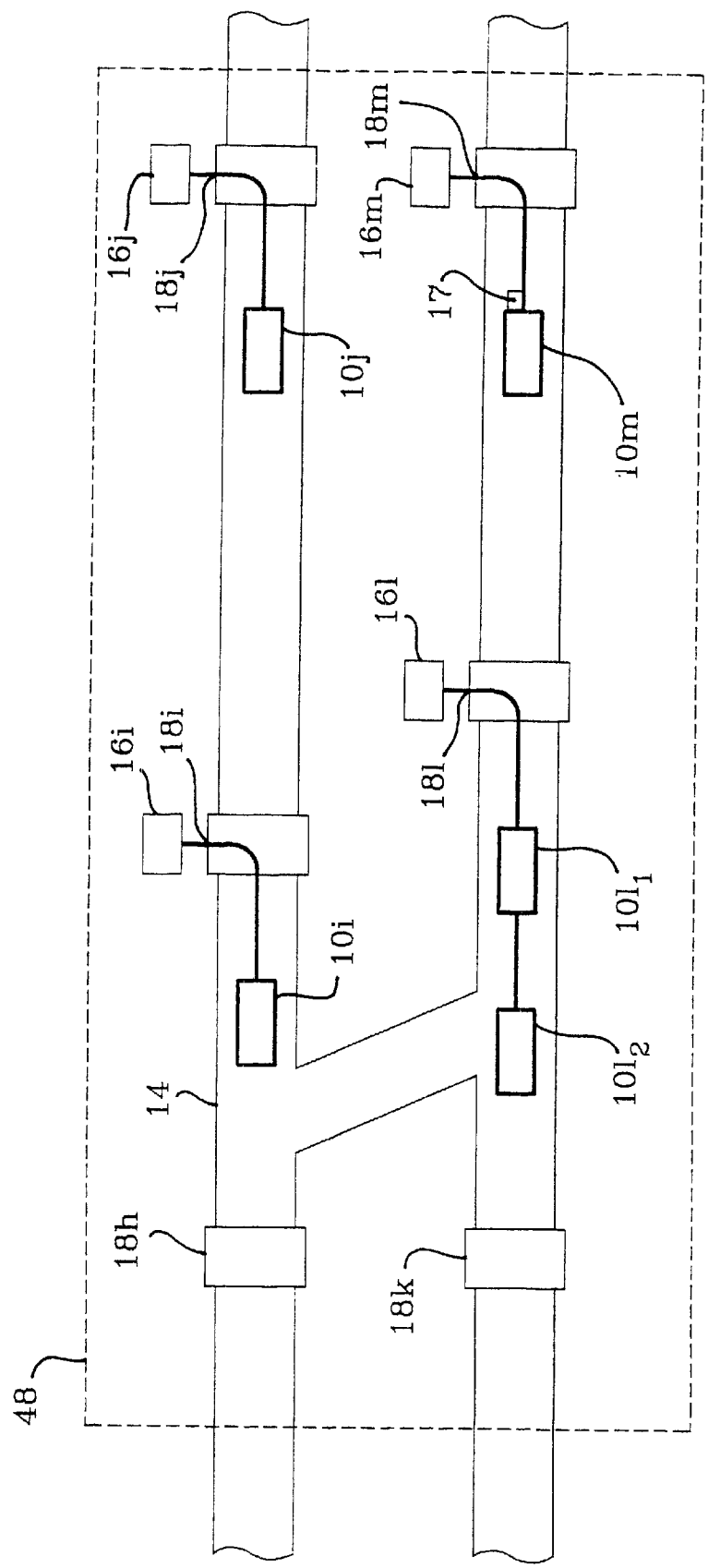

Another embodiment of a monitoring system for a pipeline is shown in FIG. 6C. A selected portion 48 of a typical water distribution pipeline 14 has a plurality of pre-existing access points 18h, 18i, 18j, 18k, 18l, 18m, such as manhole access valves. A monitoring system according to the present invention includes hydrophones 10i, 10j and 10m mounted at selected access points 18i, 18j and 18m. Each hydrophone is connected to its own data collection device 16i, 16j and 16m. At access port 18l an array having two hydrophones $10l_1$, $10l_2$ is deployed. Hydrophones $10l_1$, $10l_2$ are spaced along the longitudinal axis of the conduit and are connected by cable 12 to a data collection device 16l which has a common timer but which compiles separately the data from the two hydrophones. A transponder 17 is positioned in close proximity to hydrophone 10m. Preferably, each hydrophone is within listening distance of at least one other hydrophone.

Figure 7A:
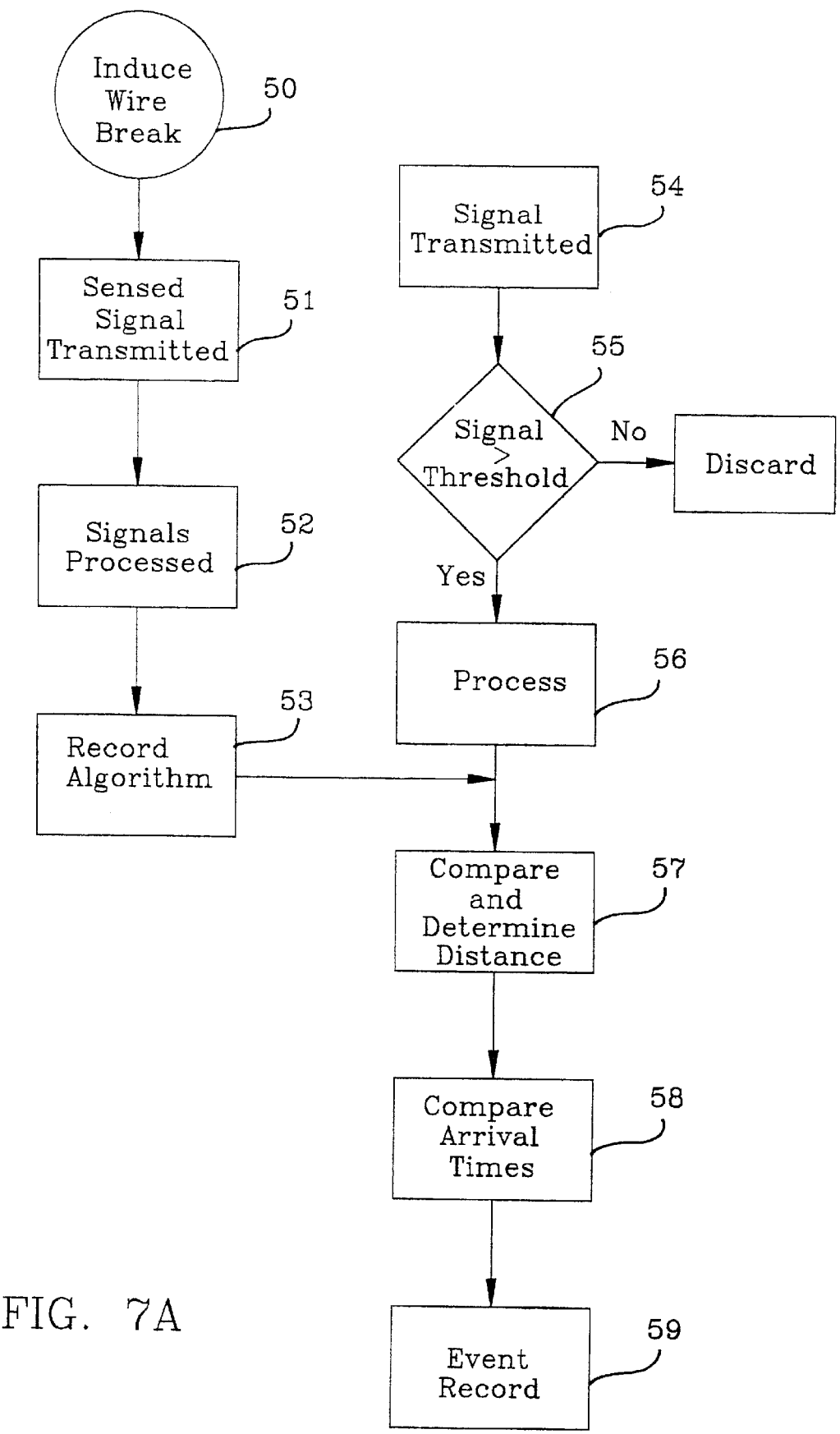
FIG. 7A is a flow chart illustrating one method for event location determination according to the present invention.

Referring to the flow chart of FIG. 7A, one mode of operation of the monitoring array shown in FIG. 6B is described. A wire break is induced at a known location (50) relative to the hydrophone locations. Signals sensed at the hydrophones are transmitted (51) to the data collection device and the signals resulting from the induced wire break are, either immediately or at a later time, processed (52), whereupon the characteristics of each signal are determined, such as total power, total energy, the amount of energy in certain frequency bands, the amount of power in certain frequency bands, the shape of the time domain graph, the shape of the frequency time domain graph, the total period in which the time domain graph exceeds a certain threshold, the total period in which a certain band of frequencies exists in the time domain and/or the relationship of the time domain data and the frequency domain data. The signals from the induced wire break will be attenuated by the conditions in the pipeline and, additionally, in proportion to the distance the signal has traveled. An algorithm is obtained using the signal characteristic information which relates the degree of attenuation to the distance traveled by the signal from the known location of the break to the hydrophone and this algorithm is saved (53).

During normal operation of the monitoring system, signals sensed at the hydrophones are continuously transmitted (54) to the data collection device. Any signal which exceeds a background noise threshold (55) is recorded for further processing. Processing can occur either immediately or at a later date. During processing (56), a recorded signal is examined to determine its signal characteristics resemble those characteristics expected for a wire breakage event. Any data from step 56 which is determined to resemble a wire break, is compared and analyzed (57) with the algorithm obtained in step 53 to determine if it resembles the signal characteristics of the induced wire break and to determine at which distance from the hydrophone the event likely occurred. The signal This method is used for signals detected by any of the hydrophones in the array. All of the event data from the hydrophones which appears to correspond to the same event of interest can be compiled and processed, either immediately or at a later date, to determine the location of the event more precisely.

Where a signal is detected on a two hydrophone array (i.e. on the array including hydrophones $10e_1$, $10e_2$), the times of arrival of the signal at the two hydrophones are compared (58) to determine which at which hydrophone the signal first arrived and thereby, the direction from which the signal arrived at the two hydrophone array. From the data, a record is compiled (59) noting the distance over which the signal traveled and the direction from which it came.

Figure 7B:
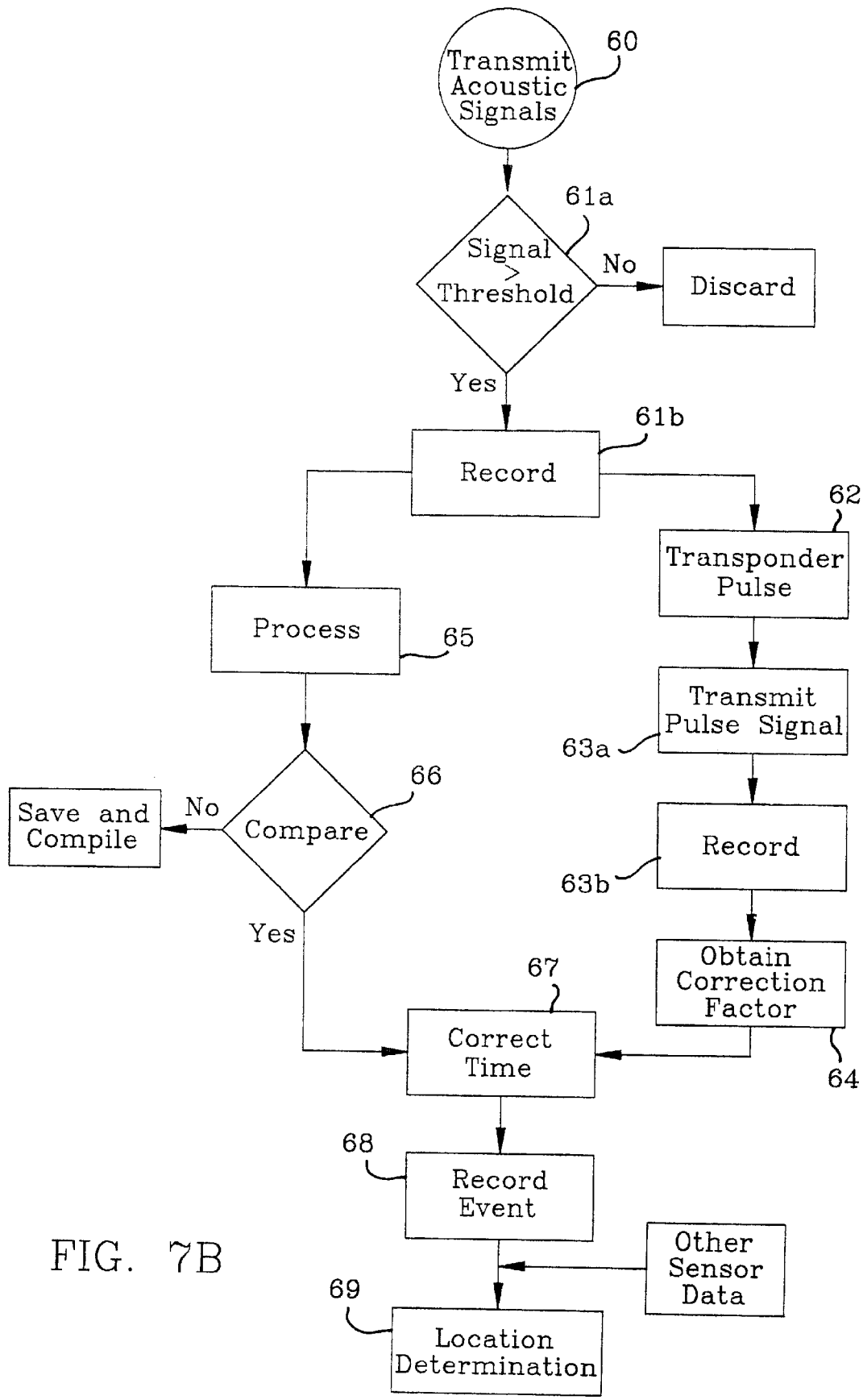
FIG. 7B is a flow chart illustrating another method for event location determination according to the present invention; and, FIG. 8 is a record of tracings from sensors illustrating an event location method according to the present invention.

Referring to the flow chart of FIG. 7B, another mode of operation of the monitoring array shown in FIG. 6C is described. Signals sensed at the hydrophones $10i$, $10j$, $10l_1$, $10l_2$ and $10m$ are continuously transmitted (60) to their data collection devices $16i$, $16j$, $16l$ and $16m$. Once a signal exceeds a background noise threshold (61a), the device records (61b) the signal and identifies it with a time of arrival. When a signal is detected at hydrophone $10m$ which exceeds the background noise threshold, an extra series of events begins wherein transponder 17 is induced to emit an acoustic pulse (62) having known characteristics (Step 62 only occurs in sensors responsible for stimulating transponders). Signals relating to the pulse of step 62 are sensed at each of the hydrophones and transmitted (63a) to their data collection devices. The signals exceed the background noise threshold and are recorded (63b) along with a time of arrival. The data collection device of hydrophone $10m$ is selected not to induce transponder 17 in response to the transponder pulse.

Either at a later time or immediately, the recorded data from step 63b are processed to obtain a correction factor (64) for arrival times between the hydrophones to effectively synchronize the timing information from the devices 16. The recorded data from step 61b are processed (65) to determine the signal characteristics. The data acquired in step 65 is compared (66), for example, with the data from a previously induced wire break to determine if the data appear to resemble data from a wire break. Data from step 66 which is determined to resemble a wire break are corrected (67) using the correction factor obtained in step 64. The data acquired in step 67 are then compiled and a final record produced (68) having a corrected time of arrival according to the synchronization. The signal data which appear to relate to the same event of interest from all of the hydrophones are compiled and processed to determine differences in arrival time for the signals between the hydrophones and thereby to permit determination of the location of the event (69).

Figure 8:
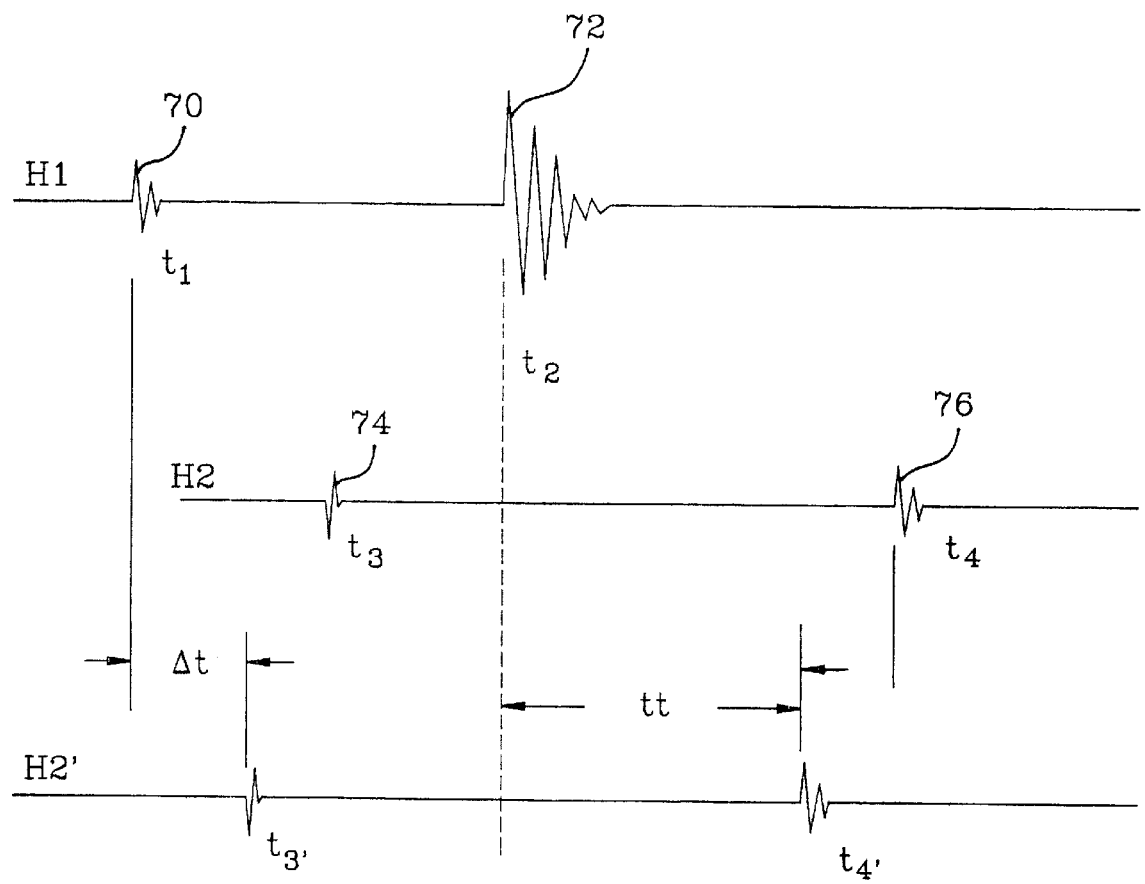

Referring to FIG. 8, the method of using a transponder to synchronize the timers of remote data collection devices is illustrated. H1 is the trace for signals received from a first hydrophone, while H2 is the trace for signals received from a second hydrophone. The first hydrophone receives an acoustic signal 70 at time t1. After a short delay, a transponder at the first hydrophone generates a pulse recorded as signal 72 at time t2. Meanwhile, the second hydrophone receives an acoustic signal 74 at t3 and an acoustic pulse 76 at t4. From comparison of the signal characteristics, it is determined that signals 70 and 74 relate to the same event and signals 72 and 76 relate to the pulse generated by the transponder. Knowing the actual signal travel time tt between the first hydrophone and the second hydrophone, trace H2 can be shifted, shown as trace H2', so that the times of the acoustic signal t3' and the acoustic pulse t4' correspond directly with the time calibrations for trace H1. Trace H2' is effectively synchronized with trace H1 and permits direct comparison of the two traces to determine the actual difference in arrival time Δt between the two hydrophones. Knowing the distance between the first and second hydrophones and knowing that they straddle the position of the event of interest within the conduit (i.e. Δt is less than the time which would be required for an acoustic signal to pass the full distance between the two hydrophones), the rate of signal propagation within the conduit can be used to determine the location of the event from Δt.

While particular embodiments of the invention have been described, it will be apparent to one skilled in the art that variations can be made to such embodiments without departing from the scope of the invention.

What is claimed is:

1. A sensor device for use in a pipeline comprising:
    (a) a plurality of sensors fixed together in relative position, and;
    (b) means for determining the orientation of at least one of the said plurality of sensors relative to a known direction.

2. The device as claimed in claim 1, wherein the sensors are hydrophones.

3. A sensor device as claimed in claim 1 additionally comprising data collection means for separate collection of data from each of said plurality of sensors and data collection means for collecting data relative to the orientation of said one sensor.

4. A pipeline system having a plurality of access points at known locations, comprising:
    (a) a plurality of acoustic sensors, at least one of such sensors being connected to each of said access points,
    (b) a data collection device for each acoustic sensor, and
    (c) means for generating an acoustic signal upon collection of data having predetermined characteristics by a said data collection device.

5. The pipeline system as claimed in claim 4, wherein each data collection device is separate from any other data collection device.

6. The pipeline system as claimed in claim 4, wherein the means for generating an acoustic signal is located within the pipeline.

7. A method of acquiring acoustic data in a pipeline having access points at known locations which comprises:
    (a) deploying a plurality of first acoustic sensors, each having its own data collection device each first sensor being connected to a different one of said access points,
    (b) monitoring said first sensors for detected acoustic emissions,
    (c) recording data relating to the acoustic emissions detected by the acoustic sensor at each access point to its own data collection device (d) after receipt of a detected acoustic emission, generating an acoustic signal, and (e) recording data related to the acoustic signal at at least two first sensors.

8. The method of claim 7 comprising (e) deploying a second acoustic sensor longitudinally spaced along the pipeline from a first acoustic sensor and connected to the same access point as said first sensor, (f) monitoring said second sensor for detected acoustic emissions and (g) recording data relating to the detected acoustic emissions.

9. The method of claim 7 wherein the data collection devices each have timers and the timers are synchronized between the data collection devices.

10. The method of claim 9 further comprising generating an acoustic pulse at a selected time to synchronize the timers.

11. The method of claim 7 further comprising (d) deploying within the pipeline from a selected one of the plurality of access points a cable having a plurality of cable-mounted acoustic sensors thereon; and (e) monitoring said cable-mounted sensors for detected acoustic emissions.

12. The method of claim 7 further comprising (d) deploying within the pipeline from a selected one of the plurality of access points a cable having a plurality of cable-mounted acoustic sensors thereon;

(e) monitoring said cable-mounted sensors for detected acoustic emissions;

(f) deploying within the pipeline a device including a plurality of sensors fixed together in relative position and means for determining the orientation of at least one of the said plurality of sensors relative to a known direction; and (g) monitoring the sensors included in said device for detected acoustic emissions.

13. A method as claimed in claim 12, comprising the step of determining the orientation of said at least one sensor when a detected acoustic emission is received.

14. The method of claim 7 further comprising (d) deploying within the pipeline a device including a plurality of sensors fixed together in relative position and means for determining the orientation of at least one of the said plurality of sensors relative to a known direction; and e) monitoring the sensors included in said device for detected acoustic emissions.

15. A method as claimed in claim 14, comprising the step of determining the orientation of said at least one sensor when a detected acoustic emission is received.

16. A method of acquiring acoustic data within a pipeline which comprises:

(a) providing a plurality of sensors spaced at selected locations within the pipeline, (b) monitoring said sensors for detected acoustic emissions, (c) separately recording data relating to the acoustic emissions detected by each sensor, (d) upon detection of acoustic emissions with desired characteristics by at least two sensors, generating an acoustic signal, and (e) receiving acoustic emissions caused by said acoustic signal at at least two of said sensors, and recording data related to said emissions caused by said acoustic signal.

17. A method as claimed in claim 16, including the additional step of determining from the data recorded in steps (c) and (e) the place of origin of said emissions with desired characteristics.

18. A method of acquiring data in a pipeline comprising:

(a) deploying within the pipeline a device including a plurality of sensors fixed together in relative position and means for determining the orientation of at least one of the said plurality of sensors relative to a known direction; and (b) monitoring the sensors included in said device for detected emissions.

19. A method as claimed in claim 18, in which the sensors deployed are hydrophones, and the data to be acquired is acoustic data.

20. A method as claimed in claim 18, including the step of determining the direction, relative to said known direction, from which detected acoustic emissions reach said device.

21. A method of acquiring data in a pipeline with a fluid flowing through it, said pipeline having an access port, which method comprises:

(a) introducing into the pipeline through said access port a length of a cable having a plurality of spaced sensors along it, while retaining a portion of the cable exterior to the pipeline, (b) allowing the fluid flow within the pipeline to deploy the sensors within the pipeline to positions remote from said access port, (c) providing a monitoring location connected to said cable external to said pipeline (d) monitoring at said monitoring location for output of said sensors transmitted along said cable to said monitoring location as a result of emissions sensed by said sensors.

22. A method as claimed in claim 21 in which said sensors are monitored so that separate data is received from each sensor.

23. A method as claimed in claim 22, in which the sensors are acoustic sensors, and additionally comprising a means for generating an acoustic pulse located in the pipeline.

24. A method as claimed in claim 23, in which said means for generating an acoustic pulse is caused to emit the acoustic pulse by sending a signal to said means for generating an acoustic pulse.

25. A method as claimed in claim 24, in which acoustic signals sensed by a said sensor are transmitted along the cable to a remote location outside the pipeline.

26. A method as claimed in claim 22, wherein the sensors are spatially multiplexed.

27. A method as claimed in claim 22, in which the cable has a plurality of information-transmission channels, each sensor is connected to a unique combination of at channels, and the step of monitoring for emissions includes monitoring the plurality of channels, detecting the channels on which an emission is received simultaneously, and determining which sensor is connected to such channels.

28. A method as claimed in claim 22, in which the sensors are grouped in at least a first and a second array, with each member of said first array sharing a communication channel with a member of said second array remote from it, an independent sensor associated with said first array and having a dedicated channel not connected to any other.

29. A method as claimed in claim 21, in which the sensors are deployed to lie along the bottom of the interior of the pipe which forms the pipeline.

30. A method as claimed in claim 21, wherein the data to be acquired is acoustic data, and the sensors are acoustic sensors.

31. A method as claimed in claim 21, wherein the data to be acquired is acoustic data, and the sensors are hydrophones.

32. A method as claimed in claim 21, in which the sensors are monitored after they have been deployed to such positions remote from said access port.

33. A method as claimed in claim 21, in which the sensors are monitored while they are in the course of being deployed to such positions remote from said access port.

* * * * *